P. CROWDER.
APPLIANCE.
APPLICATION FILED NOV. 24, 1919.
1,349,368. Patented Aug. 10, 1920.
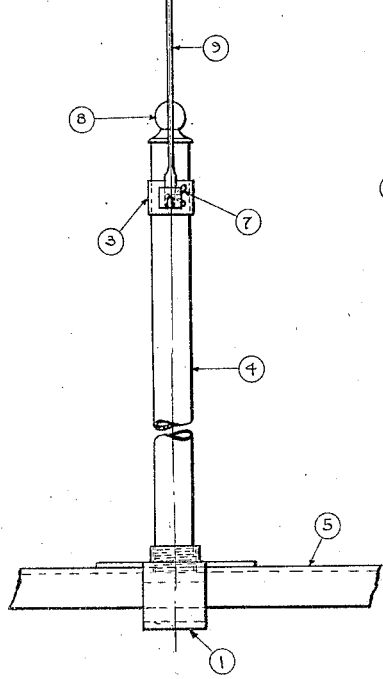
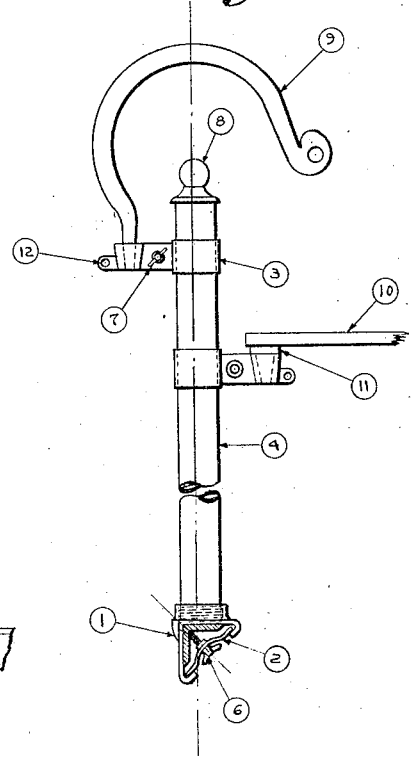
WITNESS: INVENTOR.

UNITED STATES PATENT OFFICE.

PHILIP CROWDER, OF NORTH WEYMOUTH, MASSACHUSETTS.

APPLIANCE.

1,349,368.      Specification of Letters Patent.      Patented Aug. 10, 1920.

Application filed November 24, 1919. Serial No. 340,392.

*To all whom it may concern:*

Be it known that I, PHILIP CROWDER, a citizen of England, and resident of North Weymouth, in the county of Norfolk and State of Massachusetts, have invented a new and useful Appliance, of which the following is a specification.

The main object of my invention is to provide a device for attachment to a support which device itself is preferably adapted to support other parts, and while a particular use of my device is in connection with bed-steads yet it is useful for many other purposes.

A feature of my invention is a clamp comprising three members two of which engage opposite sides of the support and the third of which operatively connects the other two.

Another feature of my invention which is of particular importance when used on the angle iron of a bed-stead for example is that one of the three members just referred to is slidably mounted on one of the other members so that the parts may be separated as desired and assembled on the angle iron, and this is of great practical importance as the angle iron is not free at its ends and it would not be possible to slide the device off from the end of the angle iron.

Another feature of my invention is a post, preferably removably mounted on the clamping device in order to carry brackets which are preferably adjustable and which may be used to support a baby crib or any desired utensil.

In the drawing:

Figure 1 is a front elevation of a device embodying my invention; and

Fig. 2 is a side elevation thereof.

I show a portion of an angle iron 5 of a bed-stead and upon this is mounted member 1 having a horizontal portion hooked to form a groove and having a vertical portion also hooked to form a groove, the horizontal portion having a boss with a threaded bore. Member 2 is preferably of metal and is adapted to slide along member 1 so that when desired it may be freed from the grooves, and member 6 is a thumb screw engaging member 2 and adapted to be screwed against the inner side of the angle iron so as to clamp member 1 to the angle iron and also clamp member 2 against movement relative to member 1. The post 4 has an exterior thread at its lower end to operatively engage the threaded boss of member 1 and at its top may be provided with a knob 8. Member 3 is a bracket surrounding post and this may be held in the desired position by adjustment of the thumb screw 7, the bracket having near its outer portion a tapered bore to receive the tapered plug end of the hanger 9 to which a baby crib or other utensil may be fastened. A similar bracket may be provided to support a tapered plug of a tray or table 10 which may be used for medicines, books, etc. Eyelet 12 may be used to receive a strap or cord for any desired purpose.

It will be clear that my invention may have supporting brackets suitably located to support the devices mentioned or to support pulleys for suspending an injured limb or a reclining strap or hammock for invalids and that my device is useful also for students and to support a food tray as well as medical or surgical instruments.

A particular advantage of my device is that it saves a great deal of space particularly in hospitals, tenements or any small room, particularly if a post is used at each side of the bed-stead to support, for example, a baby crib across the bed.

What I claim is:

1. A device of the character described comprising a member to engage one side of a support; a second member slidably mounted on the first member; and a third member movably mounted on the second member and adapted to engage the other side of the support to hold the first member to the support and to hold the second member against sliding along the first member.

2. A device of the character described comprising a member to engage one side of a support and being provided with grooves; a second member slidably mounted in said grooves; and a screw mounted on the second member and adapted to engage the other side of the support to hold the first member against movement with relation to the support and to hold the second member against movement relative to the first member.

PHILIP CROWDER.

Witness:
ERNST M. ALEXANDERSON.